United States Patent [19]
Atkins

[11] 3,801,798
[45] Apr. 2, 1974

[54] POWER TRANSFER CIRCUIT FOR MOMENTARILY ENERGIZING KEYABLE CONTROL CIRCUITS

[75] Inventor: Carl E. Atkins, Montclair, N.J.
[73] Assignee: Wagner Electric Corporation, Newark, N.J.
[22] Filed: May 17, 1973
[21] Appl. No.: 361,249

[52] U.S. Cl. .................................. 307/98, 317/146
[51] Int. Cl. .......................................... H01h 43/00
[58] Field of Search ............ 307/98, 119, 126, 141, 307/116; 317/DIG. 2, 146; 340/258 B, 258 C; 331/65, 166

[56] References Cited
UNITED STATES PATENTS
3,614,732  11/1971  Lejeune .............................. 331/65

Primary Examiner—James R. Scott
Assistant Examiner—M. Ginsburg
Attorney, Agent, or Firm—Eyre, Mann & Lucas

[57] ABSTRACT

A power transfer circuit comprising a normally-open switch and connected between a source of electrical power and one or more sub-circuits in a keyable control circuit. The closing of the normally-open switch in the power transfer circuit causes the aforementioned sub-circuits to be energized so that they may respond to the coupling of a keying network to a predetermined element of the keyable control circuit. Preferably, the normally-open switch is disposed so that it is automatically closed when the keying network is operatively coupled to the keyable control circuit.

12 Claims, 3 Drawing Figures

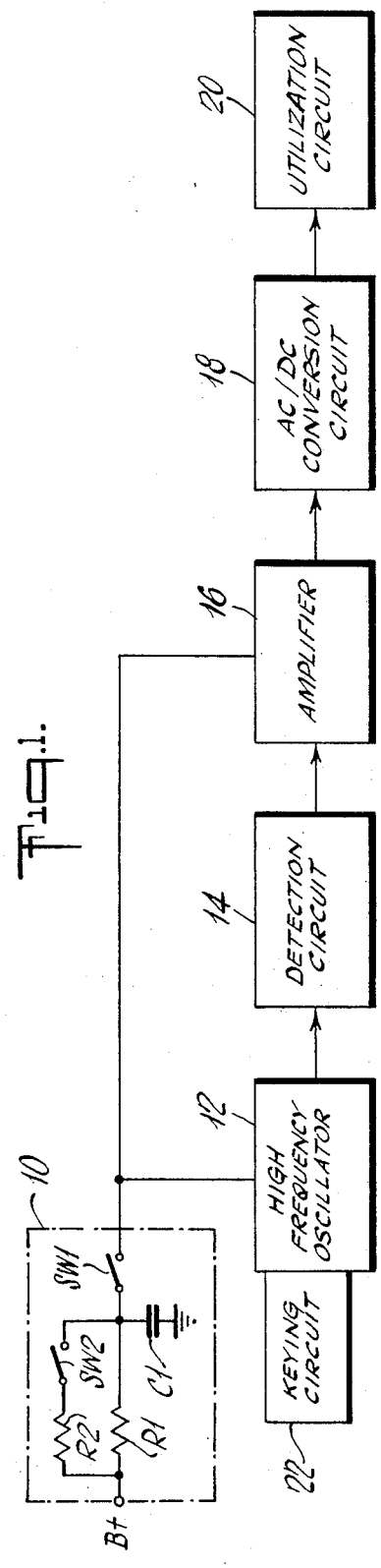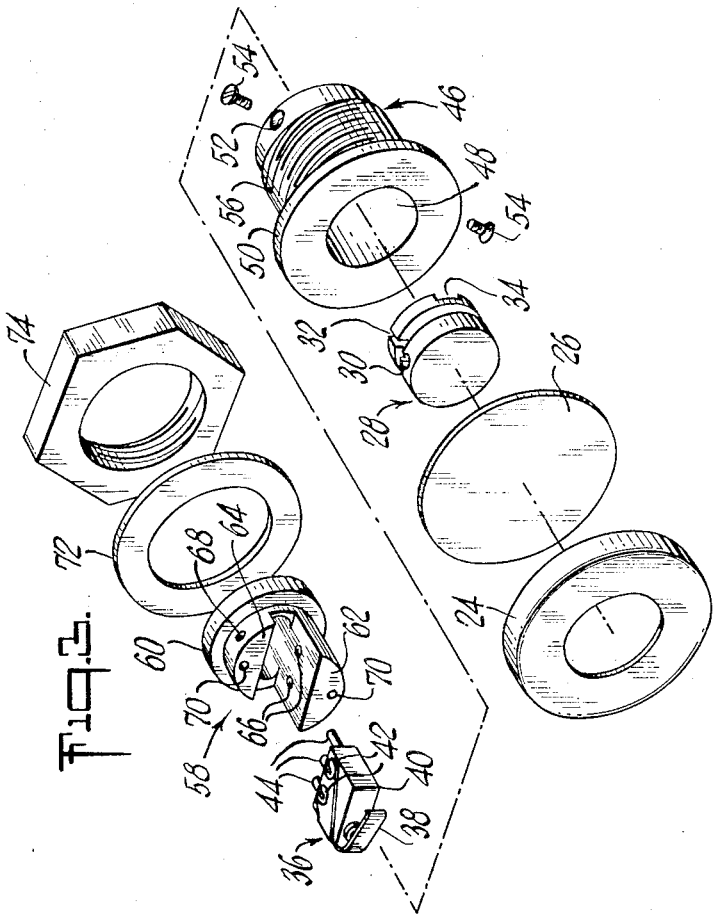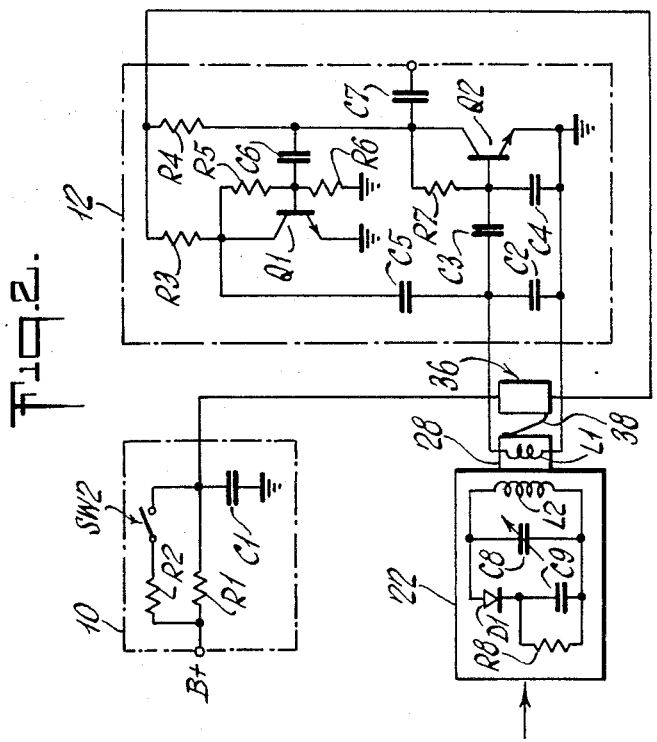

3,801,798

POWER TRANSFER CIRCUIT FOR MOMENTARILY ENERGIZING KEYABLE CONTROL CIRCUITS

CROSS-REFERENCES TO RELATED APPLICATIONS

The present invention may be advantageously incorporated into a variety of keyable control circuits, including those disclosed in copending U. S. patent application Ser. No. 127,463 entitled INDUCTION-KEYED DOOR LOCK AND POWER CONTROL CIRCUIT FOR AUTOMOTIVE VEHICLES AND THE LIKE filed on Mar. 24, 1971 in the names of Carl E. Atkins and Paul A. Carlson and issued as U. S. Pat. No. 3,723,967 on Mar. 27, 1973, and copending U. S. patent application Ser. No. 301,438 entitled INDUCTIONKEYED CONTROL CIRCUIT WITH KEYING NETWORK HAVING VARIABLE RESONANT FREQUENCY filed on Oct. 27, 1972 in the name of Carl E. Atkins.

BACKGROUND OF THE INVENTION

A variety of keyable control circuits may be found in the prior art. See, for example, U. S. Pat. No. 3,092,806 (Field); U. S. Pat. No. 3,344,629 (Burney); U. S. Pat. Nos. 3,299,424, No. 3,427,614, and No. 3,440,633 (Vinding); U. S. Pat. No. 2,511,409 (Mayberry); U. S. Pat. No. 3,182,314 (Kleist et al.); U. S. Pat. No. 3,182,315 (Sweeney); U. S. Pat. No. 3,384,892 (Postman); U. S. Pat. No. 3,628,099 (Atkins et al.); and U. S. Pat. No. 3,624,415 (Atkins et al.). These circuits typically do not provide any means for minimizing or eliminating standby power dissipation, which is a significant problem in many practical applications involving an electrochemical storage cell or battery as the source of power, e.g., in an automotive vehicle.

I have devised a power transfer circuit for interposition between a source of electrical power and a keyable control circuit, comprising a normally-open switch which, when closed, causes the control circuit to be momentarily energized. Thus, if the associated keying circuit is placed in its operative position with respect to one or more components of the keyable control circuit during this brief period of energization, the control circuit will generate an output signal. There are several advantages in employing the present invention with a keyable control circuit. First, standby power dissipation is reduced to the vanishing point. Since the power transfer circuit switch which enables connection of the power source to the control circuit is normally open, and since the power transfer circuit itself includes no DC current path to ground, there can be no power dissipation until the normally-open switch is closed. Thus, in an automotive application of the present invention, battery drain is eliminated. Furthermore, to the extent that there may be any radio-frequency interference generated by a keyable control circuit including an RF oscillator, this interference is minimized in terms of its duration since the oscillator is energized for only a brief period of time. Finally, security is enhanced since coupling the keying circuit to the keyable control circuit is not sufficient to cause generation of an output or control signal; it is also necessary to close the power transfer circuit switch so that the keyable control circuit is energized and able to respond to the coupling of the keying circuit thereto.

SUMMARY OF THE INVENTION

The present invention is embodied in and carried out by a power transfer circuit comprising a normally-open switch connected from a source of electrical power to a keyable control circuit to maintain said control circuit normally de-energized, and operative upon closing said normally-open switch to momentarily energize the keyable control circuit so that it may respond to a keying circuit coupled thereto. Preferably, the placement of the keying circuit to effect said coupling, combined with the application of pressure through said keying circuit in a predetermined direction, will close the normally-open switch.

BRIEF DESCRIPTION OF THE DRAWING

The present invention may be better understood by reading the written description thereof with reference to the accompanying drawing, of which:

FIG. 1 is a circuit diagram of a power transfer circuit embodying the present invention in combination with various sub-circuits of a keyable control circuit;

FIG. 2 is a detailed schematic circuit diagram of a preferred embodiment of the present invention in combination with a sub-circuit of an inductively-keyable control circuit and the associated keying circuit; and FIG. 3 is an exploded view of a mounting device for the normally-open switch portion of a power transfer circuit embodying the present invention and the inductance portion of a sub-circuit of an inductively-keyable control circuit of the type shown in FIG. 2.

DESCRIPTION OF THE PREFERRED EMBODIMENT

Referring now specifically to FIG. 1, the power transfer circuit 10 is essentially formed by a resistance R1 connected in series with a capacitance C1 between the terminals of a source of electromotive force such as a battery having a hot terminal at a predetermined voltage B+ and a neutral or ground terminal, with the junction of R1 and C1 being connected through a normally-open switch SW1 to one or more sub-circuits of the associated keyable control circuit. Optionally, a resistance R2 and a switch SW2 may be connected in series with one another across resistance R1 to enable adjustment of the net value of resistance connected in series with capacitance C1. A complete keyable control circuit of the inductively-coupled type typically includes a high-frequency oscillator 12 having its output applied to a detection circuit 14, the output of which is fed to an amplifier 16. An AC/DC conversion circuit 18 may be employed to produce a signal which is applied to a utilization circuit 20. A keying circuit 22 may be brought into or removed from proximity with an element of the high-frequency oscillator in order to vary its output so that the energization state of the utilization circuit 20 is altered. As many subcircuits of the keyable control circuit as require a power input to be operative may be controlled by the power transfer circuit 10.

Since power transfer circuit 10 is essentially a series RC circuit having its output derived at the high side of the normally fully-charged capacitive component C1, when switch SW1 is closed, full source voltage will be immediately applied to the portions of the keyable control circuit connected to the contact of switch SW1. However, since a DC current path is now closed through switch SW1 and at least one sub-circuit of the keyable control circuit such as high-frequency oscillator 12, capacitance C1 will be shunted to some degree. Thus, with the appropriate selection of the values of the components of the power transfer circuit 10 in the light of the known values of the components of the sub-circuits in the keyable control circuit to which the power transfer circuit 10 is connected, it is possible to arrange for energization of the sub-circuits of the keyable control circuit for only a predetermined period of time, after which the voltage across capacitance C1 drops below a minimum level required to sustain energization. More specifically, if the minimum voltage level required to energize the high-frequency oscillator 12 to a point where it is normally oscillatory is known, the values of the components of power transfer circuit 10 may be selected so that oscillator 12 will be oscillatory for only a predetermined period of time after the closing of switch SW1, during which time period the keying circuit 22 may be coupled to oscillator 12 to cause predetermined variations in the output of oscillator 12. The keyable control cicuit will, under these circumstances, cause a change in the energization state of utilization circuit 20. The values of the components of power transfer circuit 10 must therefore be selected so that there is at least a partial discharge of capacitance C1 from its initial voltage level substantially equal to the source B+ to below the voltage level which is necessary to sustain the operation of oscillator 12. Thus, no matter how long switch SW1 is held closed, it is impossible to extend the duration of energization of the keyable control circuit. The net value of resistance connected in series with capacitance C1 may be made variable by the inclusion of a second resistance R2 and a switch SW2 connected in series across R1 as shown, or by connecting a variable resistor across R1, or simply by making R1 itself variable. Such a provision enables adjustment of the final value of voltage across R1 after SW1 has been closed, since the net resistance in the power transfer circuit is then combined with the net resistance in the sub-circuits of the keyable control circuit to form a voltage divider. The net resistance in the power transfer circuit 10 also determines how quickly the keyable control circuit may be recycled, i.e., what period of time must pass after closing and subsequent reopening of switch SW1 before SW1 can again be closed and cause energization of the keyable control circuit for the desired period of time. Because capacitance C1 is partially discharged when SW1 is closed, it will be recharged when SW1 is reopened, and the rate of recharging is controlled by the net value of resistance connected in series with C1 across the terminals of power supply B+. Thus, if R1 alone is connected in series with C1, it will take longer for C1 to be recharged to essentially source voltage than if resistance R2 were connected in parallel with R1 by closing SW2. If the capability for rapid recycling is desired, it is possible to make switch SW2 normally closed and to have its armature ganged with the armature of normally-open switch SW1, so that when SW1 is closed, SW2 is opened to render resistance R2 ineffective in determining the voltage level to which C1 will discharge. In such an arrangement, when SW1 is reopened, SW2 will be reclosed to enable more rapid charging of capacitance C1 by reducing the net resistance in series therewith.

Referring now specifically to FIG. 2, the oscillator 12 and keying circuit 22 shown schematically in this figure are of the type disclosed and claimed in cross-referenced patent application Ser. No. 301,438, and are employed herein for exemplary purposes only. In operation, when the oscillator 12 is energized and the keying circuit 22 is not inductively coupled to the inductance L1 in the tank circuit of oscillator 12, the oscillator produces an oscillatory output of substantially constant amplitude at its output terminal. With the keying circuit 22 is brought into proximity with the oscillator tank circuit inductance L1 so that keying circuit inductance L2 is electromagnetically coupled thereto, the output of oscillator 12 is continuously amplitude-modulated so long as (1) keying circuit 22 is maintained in its operative position as shown and (2) the oscillator 12 is maintained operative by the power transfer circuit 10. The keying circuit 22 may be encapsulated in a suitable medium with the inductance L2 positioned close to one surface. Similarly, the inductance L1 of oscillator 12 may be either encapsulated or otherwise contained in a rigid mechanical plunger which is in mechanical engagement with an actuating arm 38 of normally-open power transfer circuit switch 36. Thus, when the keying circuit is brought into abutment with the plunger 28 as shown, thereby placing the inductances L1 and L2 in a position in which they will be electromagnetically coupled when oscillator 12 is energized, it is only necessary to apply a slight pressure in the direction of the arrow to actuate switch 36 to momentarily energize oscillator 12. In this manner, the two necessary conditions for a generation of a control signal by oscillator 12 may be met with essentially a single operation. In the embodiment of the keying circuit and keyable control circuit shown in FIG. 2, the values and/or parameters of the various circuit components are as follows:

Resistances
R1—100K ohms
R2—10K ohms
R3—1K ohms
R4—1K ohms
R5—15K ohms
R6—1K ohms
R7—100K ohms
R8—330K ohms Inductances
L1—15 microhenries
L2—15 microhenries
Diode
D1—1N5059

Capacitances
C1—160 microfarads
C2—200 picofarads
C3—5 picofarads
C4—470 picofarads
C5—5 picofarads
C6—.01 microfarads
C7—.01 microfarads
C8—200 picofarads (max.)
C9—470 picofarads Transistors
Q1—2N5132
Q2—2N5132

Referring now specifically to FIG. 3, the various components of a mounting device are shown therein, exploded along the longitudinal axis of the mounting device to enable a clearer understanding of the relationship of these various parts. An apertured bezel 24 has a weatherproof membrane 26 immediately thereunder, and a plunger 28 immediately underlies the membrane 26 in alignment with the central aperture in bezel 24. Plunger 28 has a transverse tunnel 30 extending through its upper end in close proximity to the surface for mounting the inductance L1 shown in the circuit of FIG. 2. The leads from inductance L1 extend downward through diametrically-opposed vertical slots 32. The plunger 28 also has a horizontal or transverse slot 34 cut into its bottom surface and designed for engagement with actuating arm 38 of microswitch 36. This feature prevents the rotation of the plunger relative to the remainder of the mounting device so that the orientation of the inductance L1 remains unchanged once the mounting device is installed in place. The microswitch 36 has a case 40 through which two screws 42 extend for attachment to the switch mount 58 by threaded engagement with tap holes 66. Terminals 44 extend downward from the bottom of case 40 of microswitch 36 for connection to the balance of the circuitry shown in FIG. 2. This connection is made through a slot (not visible) in the bottom of the switch mount 58, which is designed to be received in the bottom of the outer casing 46 of the mounting device. A cylindrical bore 48 extends longitudinally from top to bottom of outer casing 46, with an annular collar 50 extending radially from its upper end. Membrane 26 overlies plunger 28 and is secured to the upper surface of annular collar 50 by bezel 24, the lower edge of which may be bent under the annular collar 50. Diametrically-opposed radial holes 52 are disposed toward the lower end of outer casing 46 to receive a pair of screws 54 which extend through holes 52 to make threaded engagement with corresponding holes 68 in switch mount 58. At least a portion of the exterior surface of the outer casing 46 has threads 56 for mounting engagement with nut 74 after sealing gasket 72 has been slid over the threaded portion 56. Thus, the mounting device may be readily fixed to a panel having a suitably sized aperture through which the threaded portion 56 of outer casing 46 may be inserted.

The switch mount 58 has a base portion 60 with a slot (not shown) cut therethrough to enable connection of the terminals 44 of microswitch 36 to external circuitry. Microswitch 36 is fitted between two upstanding portions 62 and 64. The longer upstanding portion 62 has two tap holes 66 for receiving the threaded ends of the screws 42 extending through the case 40 of microswitch 36. Each of the upstanding portions 62, 64 has a cylindrical bore 70 extending parallel to the longitudinal axis of the mounting device, through which the leads of inductance L1 extend for connection to the remainder of the oscillator 12 shown in FIG. 2. The slot extending through the annular base portion 60 of the switch mount 58 extends into the space between the longer and shorter upstanding portions 62 and 64, respectively. The switch mount 58 is inserted into the lower end of cylindrical bore 48 in outer casing 46, and is retained therein by the screws 54 extending through the apertures 52 in the outer casing 46 and into the diametrically-opposed tap holes 68 in the upstanding portions 62 and 64 of switch mount 58.

The advantages of the present invention, as well as certain changes and modifications of the disclosed embodiment thereof, will be readily apparent to those skilled in the art. For instance, the power transfer circuit disclosed herein may be employed in modified form with various keyable control circuits which are ohmically rather than inductively coupled to an associated keying circuit. In such a modification, the mounting means disclosed herein would be modified to expose at least two terminals through the surface of the plunger 28 and membrane 26. It is the applicant's intention to cover all those changes and modifications which could be made to the embodiment of the invention herein chosen for the purposes of the disclosure without departing from the spirit and scope of the invention.

What is claimed is:

1. In a system comprising a source of electrical power and a control circuit keyable by the coupling thereto of an associated keying circuit, the improvement comprising:

power transfer circuit means connected between said keyable control circuit and the source of electrical power and operative, when actuated, to enable keying of said keyable control circuit by said keying circuit for a predetermined period of time after actuation of said power transfer circuit means.

2. The improvement according to claim 1 wherein said power transfer circuit means comprises:

1. a first resistance connected in series with a first capacitance across said source of electrical power; and
   2. a normally-open switch connected between the junction of said first resistance and said first capacitance and at least a portion of said keyable control circuit.

3. The improvement according to claim 2 wherein said normally-open switch is disposed so that it is closed by the positioning of the keying circuit in a predetermined spatial relationship with at least a portion of the keying circuit so that said keying and keyable circuits are coupled, combined with the application of pressure exerted through the keyable control circuit in a predetermined direction.

4. The improvement according to claim 2 further comprising a second resistance and another switch connected in series with one another across said first resistance.

5. The improvement according to claim 2 wherein a component of said keyable control circuit and said normally-open switch are combined with mounting means operative to cause closing of said normally-open switch when said keying circuit is placed in a predetermined spatial relationship for coupling with said component of said keyable control circuit, and pressure is applied through said keying circuit in a predetermined direction against said mounting means.

6. The improvement according to claim 5 wherein said mounting means comprises:

1. an outer casing having a cylindrical bore extending longitudinally therethrough;
   2. a switch mount disposed in the lower end of said longitudinal bore, said normally-open switch being mounted on said switch mount;
   3. a plunger slidably disposed in the upper portion of said cylindrical bore, said plunger having said component of said keyable control circuit disposed therein adjacent its upper surface, the lower surface of said plunger being in operative engagement with said switch; and
   4. cover means overlying said plunger and secured to the upper surface of said outer casing.

7. The improvement according to claim 6 wherein said switch comprises actuating means, and said plunger comprises means for receiving said actuating means so as to prevent rotation of said plunger in said cylindrical bore of said outer casing.

8. The improvement according to claim 6 wherein said plunger comprises a transverse tunnel for receiving said component of said keyable control circuit and further comprises vertical slots intersecting the end portions of said tunnel to enable passage of the lead wires of said component to the exterior of said mounting means for connection to the remainder of said keyable control circuit.

9. The improvement according to claim 6 wherein said switch mount comprises two cylindrical bores extending parallel to the longitudinal axis of said mounting means to enable passage of the lead wires of said component to the exterior of said mounting means for connection to the remainder of said keyable control circuit.

10. The improvement according to claim 9 wherein said switch mount comprises a base portion having a slot therein to enable connection of said switch to the remainder of said power transfer circuit means and to said keyable control circuit.

11. The improvement according to claim 6 wherein said outer casing has an annular collar extending radially from its upper end, and said cover means comprises an impervious membrane secured to the upper surface of said annular collar by a bezel.

12. The improvement according to claim 6 wherein said mounting means has a cylindrical threaded external portion, and further comprises a nut for securing said mounting means through an aperture in a panel.

* * * * *

UNITED STATES PATENT OFFICE
CERTIFICATE OF CORRECTION

Patent No. 3,801,798          Dated April 2, 1974

Inventor(s) Carl E. Atkins

It is certified that error appears in the above-identified patent and that said Letters Patent are hereby corrected as shown below:

Col. 6, Line 27 - Claim 3: "keyable control"

should read --keying--

Signed and sealed this 24th day of September 1974.

(SEAL)
Attest:

McCOY M. GIBSON JR.
Attesting Officer

C. MARSHALL DANN
Commissioner of Patents